(12) United States Patent
Hanby et al.

(10) Patent No.: US 11,027,237 B2
(45) Date of Patent: Jun. 8, 2021

(54) DIRECT INJECTION OF AQUEOUS UREA

(71) Applicant: American Electric Power Company, Inc., Columbus, OH (US)

(72) Inventors: Darren C Hanby, Frazeysburg, OH (US); Jeffery L Hofacre, Columbus, OH (US)

(73) Assignee: American Electric Power Company, Inc., Columbus, OH (US)

( * ) Notice: Subject to any disclaimer, the term of this patent is extended or adjusted under 35 U.S.C. 154(b) by 151 days.

(21) Appl. No.: 16/516,425

(22) Filed: Jul. 19, 2019

(65) Prior Publication Data

US 2021/0016225 A1    Jan. 21, 2021

(51) Int. Cl.
*B01D 53/90*    (2006.01)
*B01D 53/86*    (2006.01)

(52) U.S. Cl.
CPC ......... *B01D 53/90* (2013.01); *B01D 53/8631* (2013.01); *B01D 2251/2067* (2013.01); *B01D 2258/0291* (2013.01)

(58) Field of Classification Search
CPC ............ B01D 2251/2067; B01D 53/90; B01D 53/8631; B01D 2258/0291; B01D 53/56; B01D 2258/0283; B01D 2257/402; B01D 2257/404; F23J 11/00; F23J 15/003; F23J 15/02; F23J 2211/00; F23J 2215/10; F23J 2215/101
See application file for complete search history.

(56) References Cited

U.S. PATENT DOCUMENTS

| | | | |
|---|---|---|---|
| 3,900,554 A | 8/1975 | Lyon | |
| 4,208,386 A | 6/1980 | Arand | |
| 4,719,092 A | 1/1988 | Bowers | |
| 4,844,915 A | 7/1989 | Hooper | |
| 5,399,326 A | 3/1995 | Young | |
| 5,478,542 A | 12/1995 | Chawla | |
| 5,489,419 A * | 2/1996 | Diep | B01D 53/56 423/235 |
| 5,988,115 A | 11/1999 | Anderson | |
| 7,090,810 B2 | 8/2006 | Sun | |
| 7,829,033 B2 | 11/2010 | Sun | |
| 8,815,196 B2 | 8/2014 | Jangiti | |
| 8,815,197 B2 | 8/2014 | Broderick | |
| 9,255,507 B2 | 2/2016 | Forwerck | |
| 2011/0036078 A1 | 2/2011 | Strots | |
| 2017/0058738 A1 | 3/2017 | Smith | |

* cited by examiner

*Primary Examiner* — Timothy C Vanoy
(74) *Attorney, Agent, or Firm* — Julie E. Sanders; Anthony J. Swaneck

(57) ABSTRACT

This disclosure provides an apparatus and method for reducing emissions of nitrogen oxides ($NO_x$) from a combustion source. For example, a method and apparatus for injecting a urea solution directly into the flue gas stream of a coal-fired power plant that utilizes Selective Catalytic Reduction (SCR) to lower $NO_x$ emissions.

15 Claims, 2 Drawing Sheets

DIRECT INJECTION OF AQUEOUS UREA

BACKGROUND OF THE INVENTION

1. Field of the Invention

The present disclosure relates generally to a method and apparatus for reducing emissions of nitrogen oxides ($NO_x$) from a combustion source. More particularly, to injecting a urea solution directly into the flue gas stream of a coal-fired power plant that utilizes Selective Catalytic Reduction (SCR) to lower $NO_x$ emissions. This invention herein eliminates the vast equipment, risks of using anhydrous ammonia, and costs associated with using aqueous ammonia, or complicated systems to hydrolyze urea, before injection.

2. Description of the Related Art

One process for lowering $NO_x$ emissions is SCR, which involves chemically converting $NO_x$ to elemental nitrogen by injecting a reagent, often anhydrous ammonia, aqueous ammonia, or aqueous urea.

The following equations describe SCR with urea as the reagent:

$$(NH_2)_2CO + H_2O \rightarrow 2NH_3 + CO_2 \qquad \text{Eq. 1:}$$

$$2NO + 2NH_3 + \tfrac{1}{2}O_2 \rightarrow 2N_2 + 3H_2O \text{ and} \qquad \text{Eq. 2:}$$

$$3NO_2 + 4NH_3 \rightarrow 3\tfrac{1}{2}N_2 + 6H_2O \qquad \text{Eq. 3:}$$

The prior art contains various methods of SCR in combustion sources such as diesel engines, natural gas power plants, and solid fuel combustion units, for example utility boilers. Prior to the invention herein, a successful direct injection of aqueous urea (DIAU) for SCR has been achieved in diesel engines and natural gas turbines, but not solid fuel combustion units. Diesel engines have relatively small ducts and therefore do not face the same mixing issues as solid fuel combustion units. Diesel engines and natural gas turbines have relatively low $NO_x$ levels compared to coal-fired units as well.

Reagents include aqueous ammonia (U.S. Pat. No. 3,900,554), a mixture of $Na_2CO_3$ and urea (U.S. Pat. No. 4,844,915), a mixture of aqueous urea and a hydrocarbon above 1,600 degrees F. (U.S. Pat. No. 4,719,092), aqueous urea in a hydroxylic solvent above 1,300 degrees F. (U.S. Pat. No. 4,208,386), aqueous urea, but only into a natural gas power plant (UMICORE Catalyst USA, LLC at Reinhold Environmental Conference, February 2018), a mixture of ammonia and urea in a gas stream of 800 degrees C. to 1,000 degrees C. (U.S. Pat. No. 5,399,326), and aqueous ammonia or urea and a gas (U.S. Pat. No. 5,478.542). Others have used various means such as bypass ducts to convert ammonia to urea (U.S. Pat. No. 7,090,810) or slip streams (U.S. Pat. No. 8,815,197) in which to inject aqueous urea.

Aqueous urea, however, is preferred as a sole reagent for SCR because unlike ammonia it is safe and easier to handle. Nevertheless, the injection of urea has historically required complex and expensive decomposition means to convert the aqueous urea to ammonia gas before injection. The direct injection of urea through an ammonia injection grid ("AIG" or "grid") has been historically unsuccessful due to formation of deposits in the grid, which plug the grid. In fact, prior art states that the "direct injection of aqueous urea through a grid has generally not been practical due to the formation of deposits in the grid from the incomplete decomposition of urea in the gird" (U.S. Pat. No. 8,815,196). Difficulties also stem from the need to vaporize the urea before it hits the walls of the duct to prevent corrosion of the duct, and from difficulties associated with utilizing a DIAU at low load and low gas temperatures.

This led to attempts to inject at the walls of the duct, which have only been successful on small SCR applications such as diesel engines. This is because of insufficient distribution of the urea, in solid fuel combustion units, into the full flue gas flow and thus insufficient decomposition of the urea to ammonia before reaching the SCR catalyst. The stratification of the $NO_x$ in the flue gas that occurs before injection causes a lack of sufficient mixing when the ammonia (after the urea is converted to ammonia) reacts with it, meaning uniform distribution of ammonia at the SCR catalyst is not established and catalysis is inefficient.

The urea to ammonia conversion processes in solid fuel combustion units in the prior art are also costly to maintain and can use large amounts of high energy steam.

Extensive ammonia vapor piping used also presents safety concerns due to high risk of ammonia leaking from the piping. On the contrary, a DIAU is extremely safe.

For all the aforementioned reasons among others, the prior art lacks a successful DIAU into a solid fuel combustion unit. The disclosure herein contains a method and apparatus for a direct injection of urea into such a unit, the flue gas stream of a coal-fired power plant, avoiding all of the aforementioned expense and safety concerns.

BRIEF SUMMARY OF THE INVENTION

It is an object of the present invention to provide a system and method for a DIAU into a solid fuel combustion unit, such as the duct of a coal-fired power plant comprising a furnace, in order to lower $NO_x$ emissions via SCR. The disclosure herein eliminates the aforementioned plugging, distribution, and decomposition issues experienced, while providing for a system without use of ammonia thus avoiding its intricate handling necessities and safety risks. Injection occurs downstream of the economizer, at a lower temperature range.

Adequate mixing of the flue gas stream, and of the urea injected within the flue gas stream, is critical to achieving efficient conversion of decomposition of the urea to ammonia before reaching the SCR catalyst. The stratification of the $NO_x$ in the flue gas that occurs before injection causes a lack of sufficient mixing when the ammonia (after the urea is converted to ammonia) reacts with it, meaning uniform distribution of ammonia at the SCR catalyst is not established and catalysis is inefficient.

A preferred embodiment disclosed herein allows for the achievement of adequate mixing due to the arrangement of turbulence producing devices in the duct. However, other arrangements could also achieve adequate mixing and thus have adequate distribution of ammonia at the SCR catalyst.

Another essential component of the preferred embodiment is an atomizing urea solution injection nozzle at the end of a lance, the lance comprising an inner pipe within a larger outer pipe. Blanketing air is supplied in between the two pipes of the lance. This maintains the exterior cleanliness of the attached nozzle and maintains the temperature of the urea solution before it is injected, thereby preventing the urea solution from scaling (precipitating out of solution) but still allowing the urea to vaporize before reaching the duct walls. The minimum required pressure of the blanketing air is above the pressure of the flue gas. The preferred embodiment has significantly fewer nozzles than AIG systems, also decreasing opportunities for plugging.

These features allow for a safe DIAU using a much simpler system lacking an AIG, involved piping, and bypass ducts. The following detailed description of the preferred embodiments in conjunction with the drawings and claims elucidates these and other features of the present application.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE INVENTION

Figure 1:
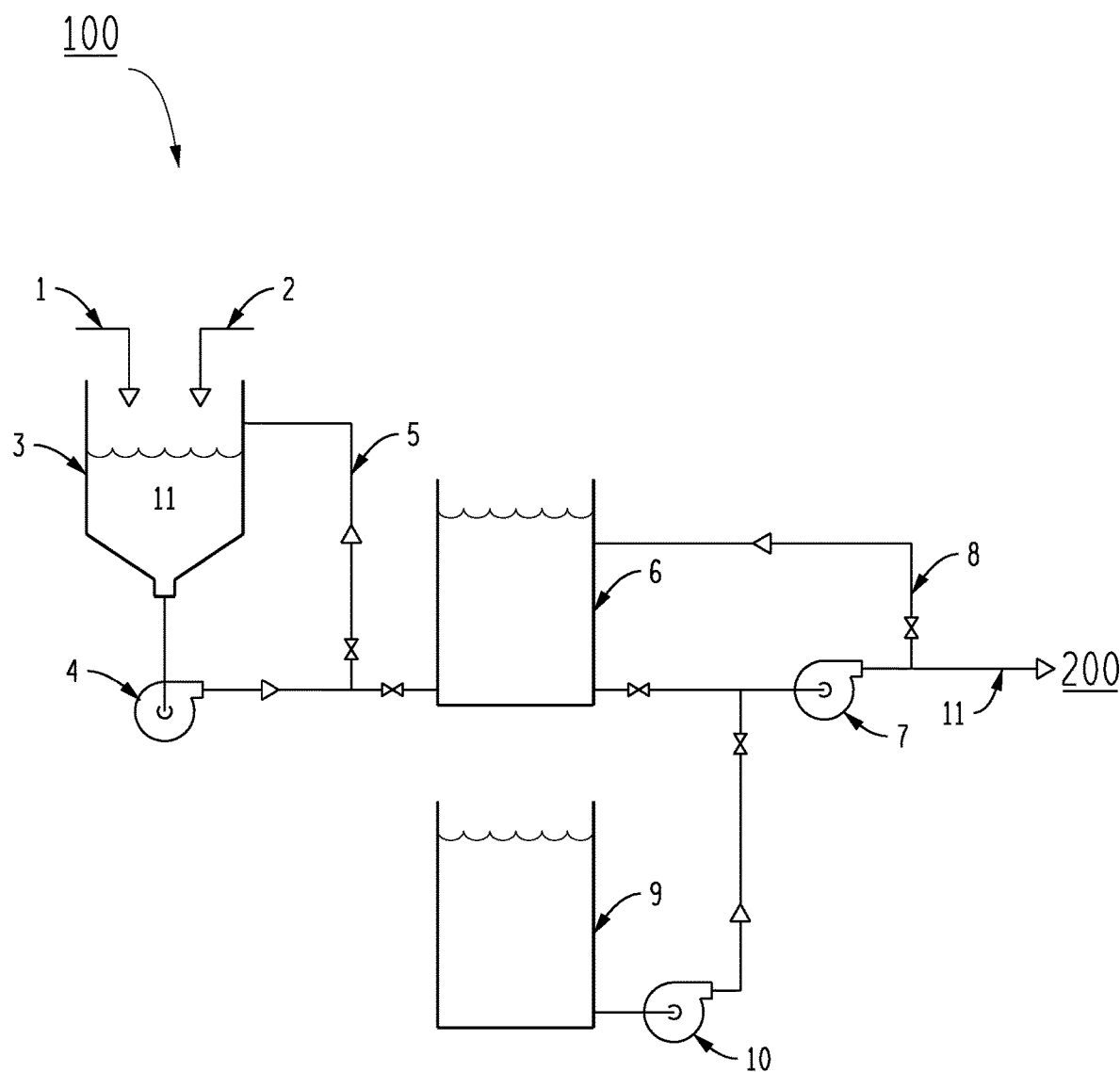
FIG. 1 shows a preferred embodiment of the pipework, condensate, urea, and urea solution mixing tanks used to prepare the urea solution for a direct injection.

FIG. 1 shows urea solution system (100), comprising a urea solution mix tank (3), urea prill (1) and condensate (2) from condensate tank (9). This preferred embodiment does not necessitate a mixer but the use of mixers would suffice. A mix tank pump (4) pumps the resulting urea solution (11) to a urea solution tank (6) and ultimately to direct injection system (200). The concentration of the urea solution (11) in this preferred embodiment is 32.5%.

A recirculation line (5) and mix tank pump (4) aid with mixing of the urea solution (11) in urea solution mix tank (3). A flushing pump (10) is preferred to flush out system (100). A urea solution pump (7) supplies urea solution (11) to system (200). A urea solution recirculation line (8) protects the urea solution pump (7).

Figure 2:
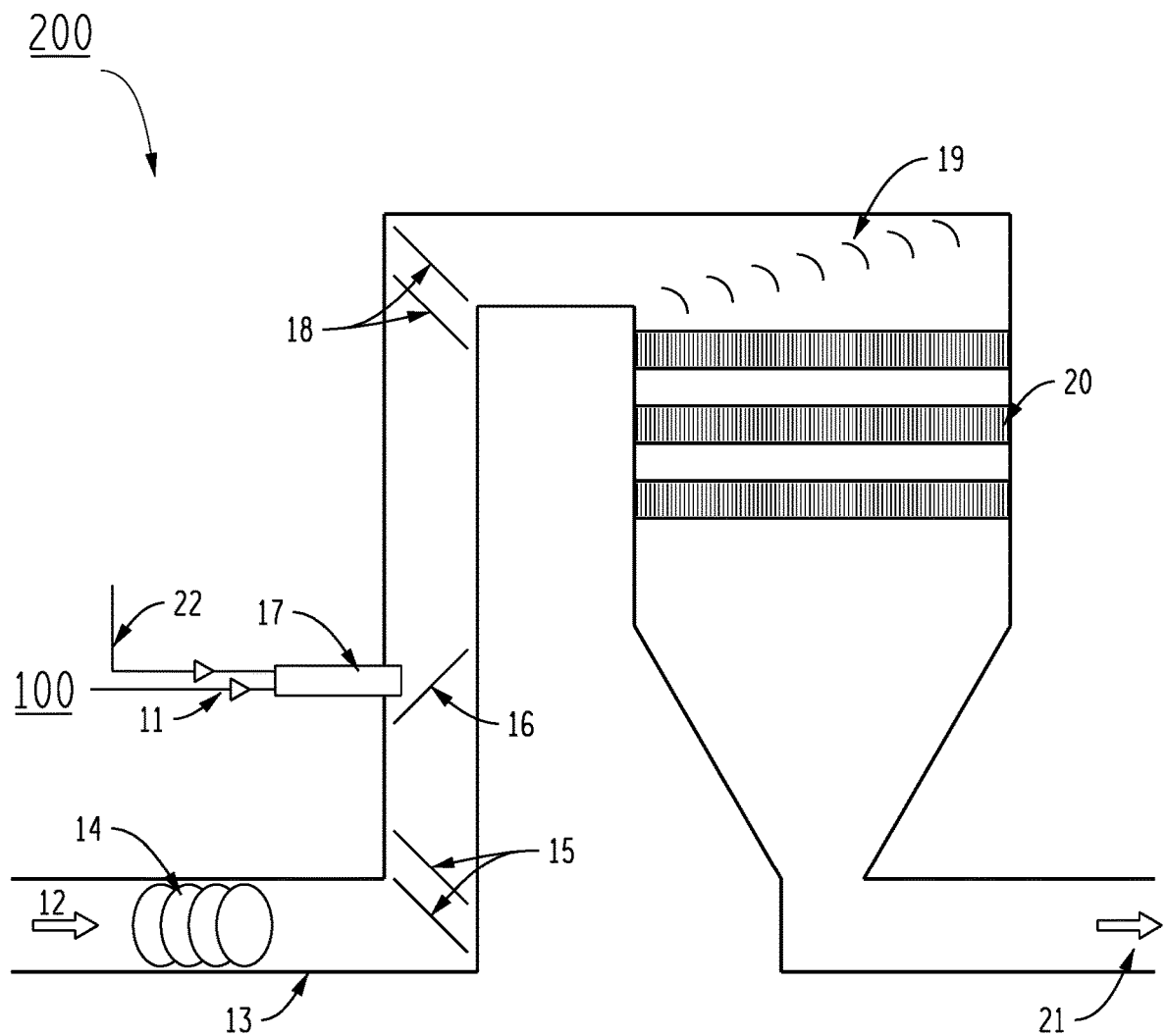
FIG. 2 shows a preferred embodiment of a method and apparatus for the direct injection of aqueous urea into a solid fuel combustion unit, the duct of a coal-fired power plant, whereby SCR is utilized to lower $NO_x$ emissions.

FIG. 2 shows the urea solution (11) injected into flue gas (12) in flue gas duct (13) of direct injection system (200). Direct injection system (200) comprises a solid fuel combustion unit, which in the preferred embodiment is a coal-fired power plant.

This injection occurs after flue gas (12) has been passed over first turbulence producing device, (14) and (15), to generate adequate mixing of the flue gas (12). Other arrangements of turbulence producing devices can suffice, as long as adequate mixing results.

The urea solution (11) is injected via a urea solution injection nozzle with a lance further comprising an outer larger pipe and a smaller inner pipe at the end (17). Blanketing air (22) having a velocity equal to that of urea solution (11) to be injected travels through lance (17), between the two pipes of lance (17), to maintain the cleanliness of the tip of the lance's nozzle. This also prevents urea solution (11) from scaling (precipitating) on the inner pipe of lance (17), thereby preventing plugging. Blanketing air (22) must be above the pressure of flue gas (12). Once urea solution (11) enters flue gas duct (13), the thermal energy of flue gas duct (13) heats the urea solution to a temperature adequate for the catalysis reaction using a SCR (20).

The preferred embodiment contains one nozzle per 50-100 megawatts (MW) of generation, as well as flow rate of 0.25 gallons per minute to 1.5 gallons per minute, which also prevents plugging due to the increased flow through fewer nozzles. An opening of 0.05 inches to 0.1 inches per nozzle is preferred for minimal plugging.

Proximate to lance (17) is a second turbulence producing device, (16) and (18), which provides for adequate mixing of urea solution (11) in flue gas (12). Turning vanes (19) also help reduce pressure drop and help provide even distribution before the SCR (20). Other arrangements of turbulence producing devices can suffice, as long as adequate mixing results. The urea solution (11) is converted to ammonia using only the heat in the flue gas duct (13). Then the flue gas, comprising ammonia, reaches SCR (20), where $NO_x$ is reduced, and the flue gas (12) and its components are ultimately discharged to the atmosphere (21).

Experimental Data

Data from a continuous emissions monitoring system (CEMS) supports the conclusion that there is a 3% increase in process efficiency, resulting in the same NO, removal rate using less urea as the prior ammonia system. The 3% increase in efficiency may be due to blow down that occurred in the prior ammonia system, as the DIAU disclosed herein has no blow down.

What is claimed is:

1. A method for reducing the concentration of at least one predetermined chemical constituent comprising:
    selecting the at least one predetermined chemical constituent for removal from an exhaust gas stream produced by combustion of a solid fuel and having a thermal energy component and a pressure;
    passing the exhaust gas stream through a first turbulence producing device so as to distribute the predetermined chemical constituent throughout the exhaust gas stream,
    injecting into the exhaust gas stream, at an injection location and via at least one atomizing nozzle proximate to a second turbulence producing device, at least one reagent having a temperature and a pressure selected to facilitate the removal of the at least one predetermined chemical constituent;
    converting the at least one reagent to a first reaction by-product, utilizing substantially only the thermal energy present in the exhaust gas stream;
    passing the exhaust gas stream through the second turbulence producing device so as to distribute the first reaction by-product and the predetermined chemical constituent substantially uniformly throughout the exhaust gas stream;
    reacting the at least one predetermined chemical constituent with the first reaction by-product, converting the predetermined chemical constituent to a second reaction by-product, thereby reducing the concentration of the chemical constituent in the exhaust gas stream; and
    reacting the at least one predetermined chemical constituent and the first reaction by-product in the presence of a catalyst downstream of the injection location and first and second turbulence producing devices, whereby the catalyst acts upon the at least one predetermined chemical constituent and the first reaction by-product, converting substantially all of the at least one predetermined chemical constituent into the second reaction by-product.

2. The method according to claim 1, further comprising connecting the atomizing nozzle to a lance, the lance further comprising an inner pipe, a larger outer pipe, and a space in between the inner and outer pipe, the space in between the inner and outer pipe transporting a pressurized gas having a pressure above the pressure of the exhaust gas stream, wherein the pressurized gas does not mix with the at least one reagent in or before the atomizing nozzle.

3. The method according to claim 2, wherein the injecting step provides a minimum injection flow rate of the at least one reagent through the at least one atomizing nozzle reducing plugging of the atomizing nozzle by the at least one reagent, and wherein the at least one reagent does not mix with the pressurized gas in or before the atomizing nozzle.

4. The method according to claim 3, wherein the injecting step injects the at least one reagent at a pressure substantially atomizing the at least one reagent at an interface of the heated exhaust gas stream and the atomizing nozzle.

5. The method according to claim 4, further comprising maintaining the cleanliness of the atomizing nozzle with the pressurized gas of the lance, and maintaining the temperature of the reagent to prevent the reagent from precipitating.

6. The method according to claim 1, wherein the injecting step further comprises injecting the at least one reagent into the exhaust gas stream at a rate determined by comparing a concentration of the at least one predetermined chemical constituent after the catalyst and a concentration of the at least one predetermined chemical constituent before the catalyst.

7. An apparatus for reducing the concentration of at least one redetermined chemical constituent comprising:

a solid fuel combustion unit further comprising a furnace;

a first turbulence producing device downstream of the furnace and configured to distribute the at least one predetermined chemical constituent substantially homogenously throughout a gas stream produced by the solid fuel combustion unit;

at least one atomizing nozzle to inject a reagent at an injection location into the gas stream;

a second turbulence producing device in proximity to the at least one atomizing nozzle, wherein the second turbulence producing device is configured to distribute a first reaction by-product and the predetermined chemical constituent substantially uniformly throughout the gas stream; and a catalytic reduction module downstream of the injection location and first and second turbulence producing devices to act upon the at least one predetermined chemical constituent and the first reaction by-product to convert substantially all of the at least one predetermined chemical constituent into a second reaction by-product.

8. The apparatus according to claim 7, wherein the atomizing nozzle is connected to a lance, the lance further comprising an inner pipe, a larger outer pipe, and a space in between the inner and outer pipe, wherein the space in between the inner and outer pipe transports a pressurized gas having a pressure above the pressure of the exhaust gas stream, and wherein the pressurized gas does not mix with the at least one reagent in or before the atomizing nozzle.

9. The apparatus according to claim 8, wherein the gas stream is a flue gas from coal-fired power generating unit, the catalytic reduction module is a Selective Catalytic Reactor, the first reaction by-product is ammonia, and the at least one reagent is a urea solution.

10. A method for reducing the concentration of at least one predetermined chemical constituent which comprises the steps of:

generating a gas stream utilizing a solid fuel combustion unit wherein the gas stream comprises a thermal energy component, a pressure component, and the at least one predetermined chemical constituent;

selecting at least one reagent having a temperature and a pressure, such reagent selected to facilitate the removal of the at least one predetermined chemical constituent from the gas stream;

passing the gas stream through a first turbulence producing device so as to distribute the predetermined chemical constituent throughout the gas stream, injecting into the gas stream, at an injection location and via at least one atomizing nozzle proximate to a second turbulence producing device, the at least one reagent selected to facilitate the removal of the at least one predetermined chemical constituent;

converting the at least one reagent to a first reaction by-product, utilizing substantially only the thermal energy present in the gas stream;

passing the gas stream through the second turbulence producing device so as to distribute the first reaction by-product and the predetermined chemical constituent substantially uniformly throughout the gas stream;

reacting the at least one predetermined chemical constituent with the first reaction by-product, converting the predetermined chemical constituent to a second reaction by-product, thereby reducing the concentration of the chemical constituent in the exhaust gas stream; and reacting the at least one predetermined chemical constituent and the first reaction by-product in the presence of a catalyst downstream of the injection location and first and second turbulence producing devices, the catalyst acting upon the at least one predetermined chemical constituent and the first reaction by-product, converting substantially all of the at least one predetermined chemical constituent into a second reaction by-product.

11. The method according to claim 10, further comprising connecting the atomizing nozzle to a lance, the lance further comprising an inner pipe, a larger outer pipe, and a space in between the inner and outer pipe, the space in between the inner and outer pipe transporting a pressurized gas having a pressure above the pressure of the exhaust gas stream, wherein the pressurized gas does not mix with the at least one reagent in or before the atomizing nozzle.

12. The method according to claim 11, wherein the injecting step provides a minimum injection flow rate of the at least one reagent through the atomizing nozzle reducing plugging in the atomizing nozzle by the at least one reagent, and wherein the at least one reagent does not mix with the pressurized gas in or before the atomizing nozzle.

13. The method according to claim 12, wherein the pressure of the reagent in the injecting step substantially atomizes the at least one reagent at an interface of the gas stream and the atomizing nozzle.

14. The method according to claim 13, further comprising maintaining the cleanliness of the atomizing nozzle with the pressurized gas of the lance, maintaining the temperature of the reagent to prevent the reagent from scaling.

15. The method according to claim 10, wherein the injecting step further comprises injecting the at least one reagent into the exhaust gas stream at a rate determined by comparing a concentration of the at least one predetermined chemical constituent after the catalyst and a concentration of the at least one predetermined chemical constituent before the catalyst.

* * * * *